United States Patent
Salajegheh et al.

(10) Patent No.: US 10,102,368 B2
(45) Date of Patent: Oct. 16, 2018

(54) INFORMATION FLOW TRACKING USING INCREMENTAL PROFILING

(71) Applicant: QUALCOMM Incorporated, San Diego, CA (US)

(72) Inventors: Mastooreh Salajegheh, Santa Clara, CA (US); Mikhail Kazdagli, Austin, TX (US); Mihai Christodorescu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 15/001,420

(22) Filed: Jan. 20, 2016

(65) Prior Publication Data

US 2017/0206350 A1    Jul. 20, 2017

(51) Int. Cl.
*G06F 21/55* (2013.01)
*G06F 11/36* (2006.01)
*G06F 21/52* (2013.01)
*G06F 21/56* (2013.01)

(52) U.S. Cl.
CPC ........ *G06F 21/552* (2013.01); *G06F 11/3636* (2013.01); *G06F 21/52* (2013.01); *G06F 21/556* (2013.01); *G06F 21/566* (2013.01)

(58) Field of Classification Search
CPC .......................... G06F 11/3604–11/362; G06F 11/3636–11/3644; G06F 11/366; G06F 21/52–21/54; G06F 21/552; G06F 21/556; G06F 21/562–21/563; G06F 21/566; G06F 21/577; G06F 21/6218–21/6281; G06F 2221/033; H04L 63/1433
See application file for complete search history.

(56) References Cited

U.S. PATENT DOCUMENTS

| | | | |
|---|---|---|---|
| 6,327,699 B1* | 12/2001 | Larus | G06F 11/3612 714/E11.209 |
| 8,170,352 B2 | 5/2012 | Sandberg | |
| 8,726,392 B1 | 5/2014 | McCorkendale et al. | |
| 8,955,142 B2 | 2/2015 | Blaisdell et al. | |
| 9,015,832 B1 | 4/2015 | Lachwani et al. | |
| 2008/0168428 A1* | 7/2008 | Bates | G06F 11/3612 717/129 |
| 2013/0291055 A1 | 10/2013 | Muppidi et al. | |

(Continued)

OTHER PUBLICATIONS

International Search Report and Written Opinion—PCT/US2016/068217—ISA/EPO—dated Mar. 28, 2017.

*Primary Examiner* — Kevin Bechtel
(74) *Attorney, Agent, or Firm* — James T. Hagler; The Marbury Law Group (57) ABSTRACT

Various embodiments may include methods, devices, and non-transitory processor-readable media for performing information flow tracking during execution of a software application. A hybrid static/dynamic analysis may be used to track information flow during execution of a software application. In various embodiments, the method may predict a multiple paths of execution, and may utilize these predictions to analyze only actually executing software code. By analyzing only actually executed software code, the method may provide a lightweight and resource-efficient way of detecting actual data leaks as they occur during execution of a software application.

30 Claims, 6 Drawing Sheets

(56) References Cited

U.S. PATENT DOCUMENTS

| | | | |
|---|---|---|---|
| 2013/0312102 A1* | 11/2013 | Brake | G06F 21/577 |
| | | | 726/25 |
| 2015/0161393 A1* | 6/2015 | Pistoia | G06F 21/577 |
| | | | 726/25 |
| 2015/0227746 A1 | 8/2015 | Chen et al. | |

* cited by examiner

INFORMATION FLOW TRACKING USING INCREMENTAL PROFILING

BACKGROUND

Tracking the flow of information throughout software execution may be useful for both malware detection and privacy protection. During the execution of software applications on computing devices, programmatic or logic errors can render the application vulnerable to exploitation by malware or malicious actors. Data manipulated throughout execution of the software application can be exposed, "leaked", or lost as a result of such exploitations. The exposure of data associated with information of a personal information, such as social security numbers, taxpayer identification numbers, financial accounts information, and the like, may result in the acquisition of a user's private information by unknown parties in a violation of the user's right to privacy. Malware applications may utilize the acquired private information to advertise to the user, may sell the information to third parties, or otherwise misuse the user's private data.

SUMMARY

The various embodiments may include methods, devices for implementing the methods, and non-transitory processor-readable storage media comprising instructions causing a processor to execute operations for tracking information flow in an application executing on a computing device. Embodiment methods may include receiving an application risk assessment including sections of application code that may cause data leaks when executed, and generating an application execution profile including commonly used execution paths for the application. Embodiment methods may further include generating one or more risk summaries based on performing a first analysis on the application execution profile and the application risk assessment. Embodiment methods may further include performing a second analysis on the application code during execution of the application to identify a current execution path and current path segment, and updating the risk summaries based on a result of performing the second analysis on the application code during execution of the application.

In some embodiments, the application risk assessment may be generated by a remote device, which may be performing a robust analysis of the application to identify code segments presenting potential data leaks.

In some embodiments, the first analysis may be a static analysis performed prior to execution of the application.

In some embodiments, performing the second analysis may include tracking an execution path during execution of the application in which the tracked execution path may be the current execution path, and determining whether the current execution path is a commonly used execution path. Such embodiments may further include determining whether a data leak is occurring by comparing risk summaries to the current path segment in response to determining that the current execution path is a commonly used execution path, and initiating an alert in response to determining that a data leak is occurring. In such embodiments, updating the risk summaries may include determining whether current runtime conditions warrant modifying an existing risk summary, and modifying an existing risk summary in response to determining that current runtime conditions warrant modifying the existing risk summary. Such embodiments may include updating the risk summaries in response to determining that the current execution path is not a commonly used execution path. Such embodiments may further include performing the first analysis on the current execution path, and generating a new risk summary based on existing risk summaries that have path segments in common with the current execution path. Such embodiments may include combining portions of the existing risk summaries to generate the new risk summary. Alternatively, such embodiments may include dividing portions of the existing risk summaries to generate the new risk summary.

In some embodiments, generating the application execution profile may include performing a path analysis on the application code of the application to identify execution paths and associated path segments, and generating a secure path graph based on identified execution paths and path segments. In such embodiments, the path analysis may be a Ball-Larus path analysis.

Further embodiments may include a computing device having a processor configured to perform operations of the methods described above. Further embodiments may include a computing device having means for performing functions of the methods described above. Further embodiments include a non-transitory processor-readable storage medium on which is stored processor-executable instructions configured to cause a processor of a computing device to perform operations of the methods described above.

BRIEF DESCRIPTION OF THE DRAWINGS

The accompanying drawings, which are incorporated herein and constitute part of this specification, illustrate exemplary embodiments of the methods and devices. Together with the general description given above and the detailed description given below, the drawings serve to explain features of the methods and devices, and not to limit the disclosed embodiments.

DETAILED DESCRIPTION

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the claims.

The terms "computing device" is used herein to refer to any one or all of a variety of computers and computing devices, non-limiting examples of which include desktop computers, workstations, servers, cellular telephones, smart phones, wearable computing devices, personal or mobile multi-media players, personal data assistants (PDAs), laptop computers, tablet computers, smart books, palm-top computers, wireless electronic mail receivers, multimedia Internet enabled cellular telephones, wireless gaming controllers, mobile robots, and similar personal electronic devices that include a programmable processor and memory.

By tracking the flow of information throughout the execution of a software application, it may be possible to identify points of data leakage or loss. Once identified, points of data leakage or loss may be fixed. Thus, proper tracking of information flow prior to and throughout execution of a software application should be part of efforts to reduce instances of data leakage, loss, or exposure, and protect information from acquisition by malware applications and malicious actors.

Various embodiments include methods, computing devices implementing such methods, and non-transitory processor-readable media storing processor-executable instructions implementing such methods for performing information flow tracking during execution of a software application. A hybrid static/dynamic analysis may be used to track information flow during execution of a software application. Various embodiments may include predicting multiple paths of execution, and using predictions of path executions to analyze only those portions of the software application that will execute. By analyzing only the executing portions of the software application, the various implementations provide a lightweight and resource-efficient methods of detecting data leaks as they occur during execution of a software application without the processing overhead of monitoring all possible execution paths every time the application is run.

Before the software application is installed or compiled, a robust off-device analysis algorithm may be executed to identify code segments presenting potential for data leaks. This pre-installation analysis may be performed by a remote computing device having substantial resources. Further, an on-device pre-execution analysis may be accomplished in one or more analysis stages. The first stage may be a fast and safe pre-execution on-device static analysis technique to identify potential data leaks. The static analysis may be an algorithm executed on the installed and un-executed software, or during a first execution to determine potential data leaks based on the results of the pre-installation of analysis. A graph reachability analysis may be performed using results from the initial static analysis. These analyses may be performed before or during compilation and installation of the software application and prior to execution. Segments of the software code that present potential security or privacy risks (e.g. data leaks, exposures, or loss) may be identified during the pre-execution on-device static analysis phase. The potential data leak points identified in the robust off-device static analysis and the path segments identified by the computing device may be used to generate path-specific risk summaries of security risks (i.e., data leak points). These risk summaries may be compared to executing application to determine whether data leaks are occurring during execution.

Prior to installation of a software application on a computing device (e.g., a smartphone, a laptop, etc.), the software may undergo a robust analysis at a remote device (e.g., a testing lab) to identify potential data leak points. The robust off-device analysis may include numerous executions of the software application on a computing device or emulator performed so that differing paths of execution are followed, with the operations and behaviors of the application monitored in order to identify data leak points that may arise during various runtime conditions.

Such robust analysis procedures may be resource intensive and may significantly degrade device performance if performed on a client computing device. Thus, the application risk assessment may be generated by a software manufacturer, third party security vendor, or other service provider.

Once some or all of the applicable data leak points are identified, the data leak points and the corresponding software code segments (e.g., functions, calls, etc.) leading to or resulting in the data leak points may be added to an application risk assessment file.

The application risk assessment file may be packaged with the software application installation files. For example, the application risk assessment may be included within a "zip" file or application load file, and unpackaged during execution of an "exe" file. Including the application risk assessment file with the application installation file enables the client computing device to utilize the information flow tracking method without performing the resource intensive robust analysis.

When the application is loaded, the client computing device may perform one or more executions of the application while observing path execution patterns. A path analysis technique, such as a Ball-Larus path analysis, may be used to identify path-specific security and privacy risks. This initial path analysis may be performed by the computing device in order to generate a "secure path graph" containing information about software execution paths that do and do not present security and privacy risks. Code segments identified as presenting potential security and privacy risks may be organized into "summaries" (or templates) and stored for later use in runtime analyses. The risk summaries stored and the content of stored summaries may change over time as a result of software use patterns observed during runtime analyses.

During an initial execution, or test run of the software application, the client computing device may perform a path analysis on the software code. The path analysis may include execution of one or more path determination algorithms that identify logical segments within software execution paths. For example, a Ball-Larus path analysis algorithm may be used to identify component segments of software code. Identified path segments associated with a path of an executing application may be analyzed at runtime for data leaks.

The path analysis may identify the segments of the software application that are likely to execute in the current instantiation, thereby enabling analyses to be limited to those segments, and avoiding analyses of segments that will not or are unlikely to execute. If the identified path segments are too large, the resulting information flow tracking analysis may be unacceptably imprecise. Conversely, if the path segments are too small, the client computing device may process unnecessary amounts of data to analyze all of the path segments, thus unjustifiably consuming system resources. Hence, various techniques may be employed to determine an appropriate size of the path segments. For example, the identified segments may be conjoined with other segments or split into multiple segments as needed during runtime analysis. Each path segment may contain one or more code segments (e.g., actual application code implementing multiple function calls, library references, etc.). An algorithm may be used to determine the size of code segments included within an execution path segment, based on the predicted frequency of execution of such segments, on the predicted overhead of tracking such segments, and/or on other program related information. The algorithm may employ predefined heuristics or machine learning techniques to determine the code segment size.

The identified path segments may be used by a processor of the computing device to build an application execution profile. Various implementations may include using the computing device processor to generate the application execution profile by building a secure path graph. The indicated paths may represent commonly used execution paths providing the least risk of data leakage. The generated secure path graph may be used as an application execution profile. In various implementations, the secure path graph may be a logical combination of a control flow graph and a data flow analysis graph. The secure path graph may be a complete or incomplete representation of all of the execution paths that the program may take.

The application risk assessment may be compared, by the computing device processor, to the application execution profile to identify the potential data leak points that lie along each segment of an execution path. The computing device processor may generate a risk summary detailing all corresponding potential data leak points for each path segment. Any given path of execution may correspond to several risk summaries based on the number of identified path segments the path of execution contains. Similarly, the risk summaries, which correspond to path segments containing specific data leak points, may be stored in memory in association with numerous paths of execution, as is described in greater detail with reference to FIG. 3.

During execution of the software application, information that flows through the path segments associated with the risk summaries may be observed by the processor executing a dynamic analysis module, for occurrences of data leaks. If an execution path already included in a risk summary is taken, the risk summary information may be used to determine whether a data leak is occurring, has occurred, or could occur along the taken execution path. This determination may be done at the beginning of an execution path, during that execution path, or at the very end of the execution path. If a new execution path not previously included in a risk summary is taken, incremental information tracking may be performed. During or after execution, the computing device processor may analyze the new execution path using static analysis techniques to determine whether the execution path presents a privacy or security risk and thus should be added to an existing or new risk summary. A static analysis may be an algorithm that operates on the application code in a consistent manner with each execution, regardless of the execution options of the application.

Risk summaries may be combined if the code observer (e.g., a dynamic analysis module executed by the computing device processor) determines that two or more application code segments execute together or are linked. If the code observer determines that an application code segment associated with a summary never results in data leakage, or the associated path segment is rarely or never executed, the risk summary may be eliminated or moved to an inactive status. In this manner, software use patterns provide the basis for determining the risk summaries that are observed and monitored so only relevant risk summaries are reviewed during an execution session.

Various implementations include methods, devices implementing the methods, and non-transitory media having processor-executable instructions to implement the methods that provide a hybrid static and dynamic analysis approach to information flow tracking that adjusts to usage patterns. By pre-determining the code segments that present potential data leaks, the volume of code that must be reviewed and analyzed by the computing device processor at application runtime may be limited to only relevant code segments. Reducing the volume of code reviewed by the processor at runtime may reduce execution times and drain on power resources, thereby improving both processor operational efficiency and extending battery life. Thus, the methods may provide a lightweight and computing resource efficient solution for information flow tracking, particularly suitable for mobile computing devices.

Various embodiments may include performing a static analysis by the processor of the computing device prior to software application runtime to identify execution path segments containing code that presents potential data leaks. The first analysis may be followed by a dynamic analysis performed by the processor during an execution session of a software application to identify data leaks as they occur.

Various embodiments may include the processor of the computing device performing a static analysis to generate risk summaries of execution path segments containing application code identified as having potential data leaks prior to execution of the software application. The path segments containing application code presenting potential data leaks may be identified in an application execution profile associated with the software application.

Various embodiments may include performing, at software application runtime, a dynamic analysis of risk summaries associated with code segments containing potential data leak points to identify actual data leaks occurring at runtime.

Various embodiments may include identifying the risk summaries associated with code segments containing potential data leak points that are applicable across disparate execution sessions of a software application. In the various implementations, risk summaries associated with code segments containing potential data leak points may be combined based on application use patterns and applicability of risk summaries across execution sessions of a software application.

Figure 1:
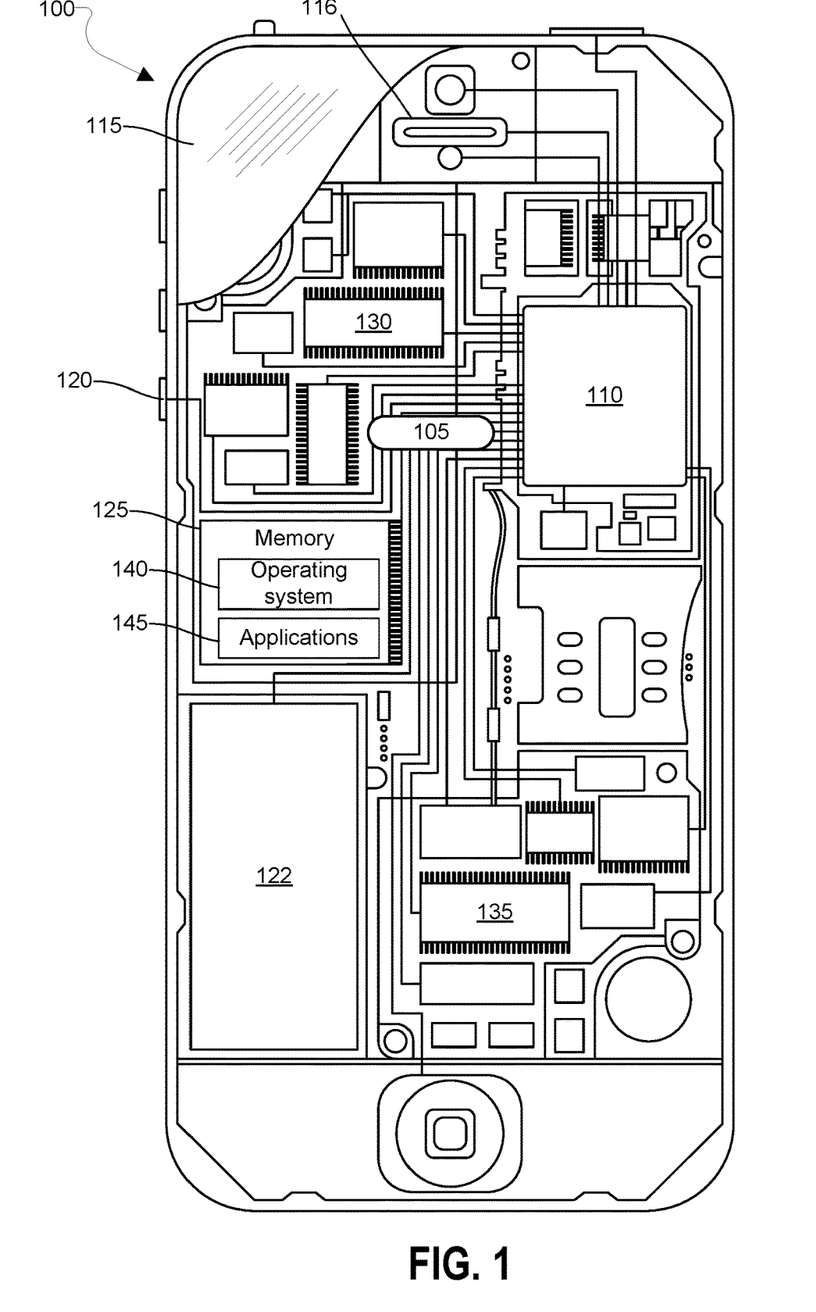
FIG. 1 is a block diagram illustrating a computing device suitable for use with various embodiments.

FIG. 1 illustrates a computing device 100 suitable for use with various embodiments. The computing device 100 is shown comprising hardware elements that can be electrically coupled via a bus 105 (or may otherwise be in communication, as appropriate). The hardware elements may include one or more processor(s) 110, including without limitation one or more general-purpose processors and/or one or more special-purpose processors (such as digital signal processing chips, graphics acceleration processors, and/or the like); one or more input devices, which include a touchscreen 115, and further include without limitation a mouse, a keyboard, a keypad, a camera, a microphone and/or the like; and one or more output devices, which include without limitation an interface 120 (e.g., a universal serial bus (USB)) for coupling to external output devices, a display device, a speaker 116, a printer, and/or the like.

The computing device 100 may further include (and/or be in communication with) one or more non-transitory storage devices such as non-volatile memory 125, which can include, without limitation, local and/or network accessible storage, and/or can include, without limitation, a disk drive, a drive array, an optical storage device, solid-state storage device such as a random access memory (RAM) and/or a read-only memory (ROM), which can be programmable, flash-updateable, and/or the like. Such storage devices may be configured to implement any appropriate data stores, including without limitation, various file systems, database structures, and/or the like.

The computing device 100 may also include a communications subsystem 130, which can include without limitation a modem, a network card (wireless or wired), an infrared communication device, a wireless communication device and/or chipset (such as a Bluetooth device, an 802.11 device, a Wi-Fi device, a WiMAX device, cellular communication facilities, etc.), and/or the like. The communications subsystem 130 may permit data to be exchanged with a network, other devices, and/or any other devices described herein. The computing device 100 may further include a volatile memory 135, which may include a RAM or ROM device as described above. The memory 135 may store processor-executable-instructions in the form of an operating system 140 and application software (applications) 145, as well as data supporting the execution of the operating system 140 and applications 145. The computing device 100 may be a mobile computing device or a non-mobile computing device, and may have wireless and/or wired network connections.

The computing device 100 may include a power source 122 coupled to the processor 110, such as a disposable or rechargeable battery. The rechargeable battery may also be coupled to the peripheral device connection port to receive a charging current from a source external to the computing device 100.

Figure 2:
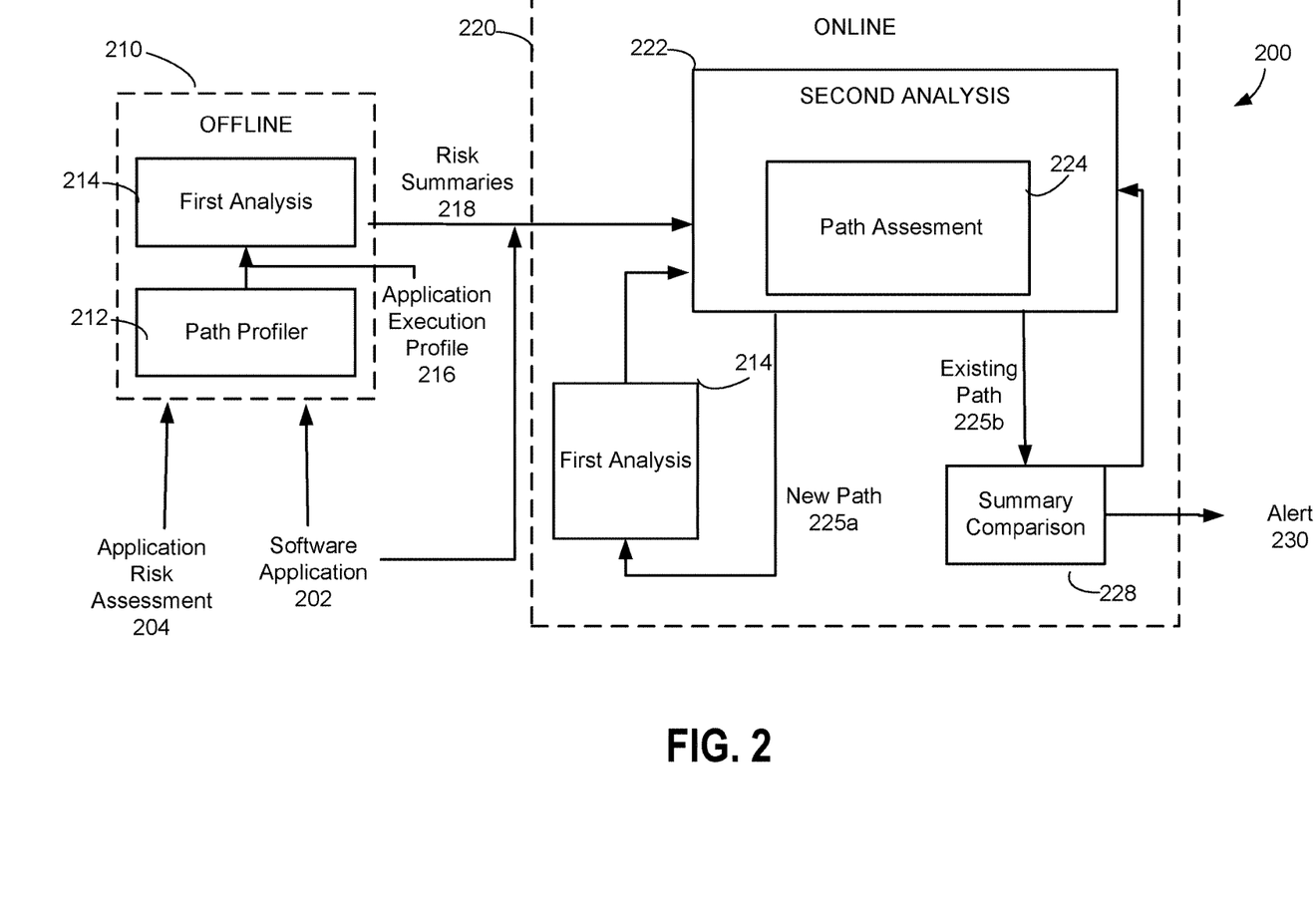
FIG. 2 is a block diagram illustrating data flow of an information flow tracking method according to various embodiments.

FIG. 2 illustrates a block diagram of data flow through an information flow tracking scheme as in various embodiments. The information flow tracking scheme 200 is shown having both offline 210 (e.g., pre-execution) and online 220 (e.g., runtime) components executing on a software application 202. Various embodiments may include receiving at a computing device 100, a software application 202 and an application risk assessment 204. The application risk assessment 204 may be generated by a remote computing device that reviews and analyzes the software code of the application to identify potential data leaks. In various implementations, the application risk assessment 204 may be a file containing data on code segments (e.g., functions, calls, etc.) identified as presenting potential data leaks. The application risk assessment 204 may be downloaded with the software application 202, loaded during installation, or otherwise stored and mounted on a memory of the computing device 100 in association with the software application 202. In various implementations, each software application may have an application risk assessment 204 specific to the software application.

In an offline 210 stage of the information flow tracking scheme 200, the received software application 202 and application risk assessment 204 may be input to one or more of a path profiler 212 module and a first analysis 214 module. A result of the offline 210 analyses may be one or more risk summaries 218 containing information regarding execution path segments containing application code identified in the application risk assessment 204. In various implementations, the offline 210 analyses may occur after the software application 202 has been installed or compiled on the computing device 100. Further, in various implementations, the offline 210 analyses may be performed by a processor 110 of the computing device 100 prior to the first user-initiated execution of the software application 202.

In various implementations, the path profiler 212 may cause the processor 110 to execute a first run or "test" run of the software application 202. The processor 110 may perform an application code path analysis during the test run in order to identify execution path component segments. Software applications may include hundreds or thousands of execution path permutations, with each instance of user input or each variable providing an opportunity for more path possibilities. Each execution path may be composed of segments, those lengths of path lying between two path split points. For example, a path segment may begin with a user input for a day of the week, and may end at a point where a Boolean variable must be evaluated to determine whether it is true or false. Because there are seven days of the week, there may be seven path segments leading from the originating point to the second point. Each path segment may be associated with different application code segments, and thus may present different risk of data leaks. The processor of the computing device may analyze the application code during the test run to identify possible paths of execution and their component path segments. This analysis may include identifying the execution paths most likely to be used during a user-initiated execution. Various implementations may include applying a Ball-Larus path analysis algorithm or other path recognition algorithm recognized in the art of graph theory to the application code during the test run. In various implementations, the path profiler 212 may further cause the processor 110 of the computing device 100 to generate a secure path graph based on a result of the path analysis. The secure path graph may be a representation of a data flow analysis and a control flow graph as will be understood by one or ordinary skill in the art. A result of the secure path graph generation by the computing device 100 processor 110 may be the application execution profile 216. The secure path graph may use program instructions as nodes, and execution transitions (i.e., control flows) between instructions as edges, and thus paths through the graph may represent execution paths taken by the application. In another embodiment, the secure path graph may use program functions as nodes and execution transitions between functions (i.e., function calls) as edges. This secure path graph may initially contain nodes and edges corresponding to one or more, but not necessarily all, the execution paths of the program. This application execution profile 216 may include information regarding the most likely execution paths and associated path segments to be executed during user-initiated execution sessions.

Various embodiments may include passing the application execution profile 216 as an input to a first analysis 214 module. The first analysis 214 module may accept the application execution profile 216 and the application risk assessment 204 file and may cause the processor 110 of the computing device 100 to produce the risk summaries 218. The first analysis 214 module may cause the processor 110 to review the path segments identified in the application execution profile 216 for instances of application code segments identified in the application risk assessment 204 file as presenting potential for data leaks. In various implementations, the first analysis may be a static analysis.

The processor 110 may generate a risk summary 218 for each identified path segment and may include an expression that may evaluate to true or false based on runtime conditions. For example, while performing the first analysis 214, the processor 110 may determine, based on the execution path segment undergoing review and an identified application code segment, that if a particular variable=a certain value (e.g., game_tries=5) during an execution session, then a data leak is occurring. Thus, the first analysis 214 module may cause the processor 110 to generate a risk summary 218 containing the expression "game-tries=5" for the relevant path segment. The risk summary 218 may be evaluated at runtime if the associated path segment is executed, thereby enabling the processor 110 to quickly determine whether a data leak is actually occurring without requiring substantial processing resources.

In various implementations, the risk summaries 218 may be stored in a memory 135. Optionally, a directory, listing, lookup table, or other reference data structure may be stored in conjunction with the risk summaries 218 to catalog existing risk summaries and respective path segment associations.

During an application execution session, the computing device 100 may execute one or more online 220 analyses. The risk summaries 218 generated by the processor 110 during the offline 210 analyses and the software application 202 may be passed as input to the offline 210 phase of the information flow tracking scheme 200. In the various embodiments, the processor 110 may execute a second analysis 222 module that may monitor the current execution path, compare the executing path segment to an applicable risk summary 218, and initiate creation of new risk summaries 218 or modification of existing risk summaries 218.

A path assessment 224 module of the second analysis 222 may cause the processor 110 to track the current execution path of the software application 202. As the software application 202 progresses through an execution session, user input (e.g., keyboard, microphone, touchscreen interactions) may result in changes in the execution path. The processor 110 may monitor this progress and may maintain in a memory, a temporary pointer to a current path segment as well as the current execution path (i.e., total path taken). Substantially concurrently, the processor 110 may compare the current execution path (i.e., the currently executing path segment) to the available risk summaries stored in memory 125. If the processor 110 retrieves a set of stored risk summaries 218, or finds an entry for associated risk summaries 218 in a stored directory, the processor 110 may consider the current execution path to be an existing path 225b. The processor 110 may execute a summary comparison 228 to determine whether a data leak is occurring.

Various embodiments may include the processor 110 comparing the present runtime conditions (e.g. variable values, user inputs, function execution status etc.) to one or more risk summaries 218 associated with the current path segment of the current execution path. If the result of the comparison indicates that a data leak is occurring, the processor 110 may initiate the display or playback of an alert 230 to the user. If no data leak is detected, the processor 110 may continue with the second analysis 222. Referring to the previous example, no alert will be initiated when the variable game_tries holds a value of 3 at the time a relevant path segment is reviewed by the processor 110. However, the processor 110 may alert 230 the user that a data leak is occurring when the variable game_tries holds the value 5.

In various implementations, the processor 110 may further determine whether a risk summary 218 should be updated or inactivated based on execution history. If a path segment is regularly executed across execution sessions, but no data leak ever occurs, the processor 110 may update the risk summary 218 to an inactive status. Inactive risk summaries 218 may be ignored by the processor 110 during the path assessment 224, until such time as a data leak occurs, or runtime conditions warrant reactivation of the risk summary 218. Thus, in some implementations, the processor 110 may review a memory 135, 125 for inactive risk summaries 218 in an attempt to reactivate unused risk summaries 218 prior to generating new risk summaries 218.

If no set of risk summary 218 is stored in association with the current execution path (e.g., one path segment does not have an associated risk summary, or the combination of path segments executed thus far during the execution session is new) then the processor 110 may determine that the current execution path is a new path 225a. The second analysis 222 may initiate the generation, by the processor 110, of a new risk summary 218. New risk summaries 218 may be created during or after an execution session by executing the first analysis 214 on the path segment. The processor may combine existing risk summaries 218 to determine the relevant evaluation expressions for the new risk summary 218, as will be described in greater detail with reference to FIG. 3. The processor 110 may perform the first analysis at runtime in a manner similar to that described with reference to the offline 210 first analysis 214 execution. A result of the first analysis 214 executed at runtime, may be a new risk summary 218, which may be stored in memory 125 and any applicable directory or reference data structure updated accordingly.

Various embodiments may, in the described manner, enable the dynamic analysis of information flow risks during an application execution session. By using pre-constructed risk summaries 218, the processor can quickly evaluate relevant runtime conditions, rather than performing a robust review of software code. Further, the dynamic analysis is adaptable to usage patterns because it enables the computing device 100 to determine what execution paths are "relevant" by generating new risk summaries as previously unused execution paths are utilized, and by moving unused risk summaries to inactive status. Thus, the processor 110 may continuously reconfigure the portions of an application being reviewed and analyzed across execution sessions. Such incremental modification of the risk summaries 218 and the resulting second analysis 222 execution, may make the information flow tracking scheme 200 versatile and relatively low in resource consumption.

Figure 3:
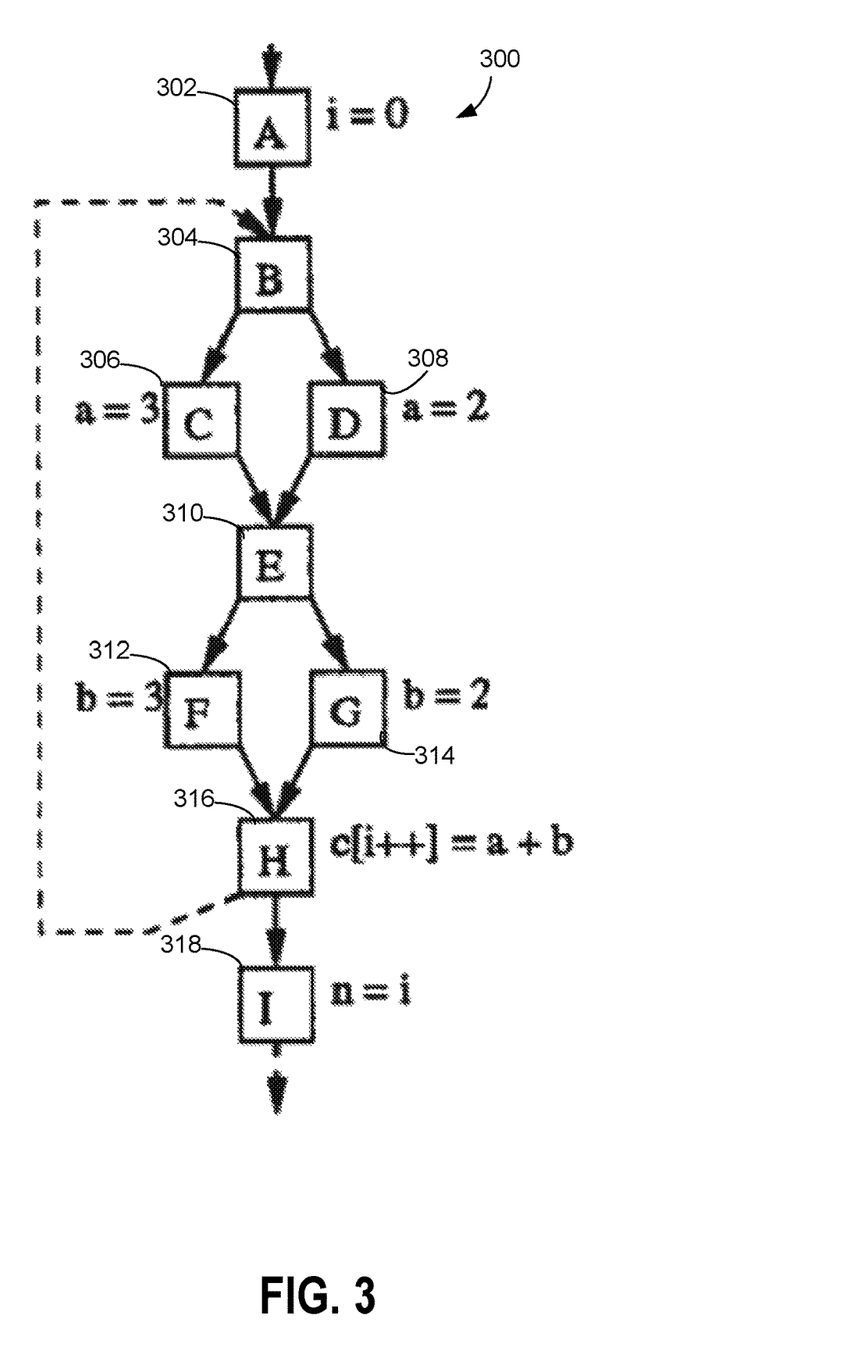
FIG. 3 is a block diagram illustrating exemplary execution path sequences in an information flow tracking method according to various embodiments.

FIG. 3 illustrates a block diagram of data flow through execution paths in various embodiments. The paths 300 may include numerous divergence points where individual risk summaries 302-318 (i.e., risk summaries 218 in FIG. 2) may be evaluated to detect data leaks. In the illustrated example, all execution paths begin with a common path segment. The common path segment is associated with a risk summary "A" 302. A functional expression "i=0" may be included in the risk summary, thereby indicating that if the variable "i" does not hold the value 0 at the time the common path segment is executed, then a data leak is occurring. The path may continue on to risk summary "B" 304, which may have no functional expression, but may instead represent a check to determine whether the execution path has crossed through the necessary point. For example, if the execution path jumped from path segment associated with risk summary "A" 302 to the path segment associated with risk summary "C" 306 then a data leak may have occurred.

At the path segment associated with risk summary "B" 304 the execution path diverges, indicating multiple options in execution. If the previous user input directed the execution path toward risk summary "C" 306, a variable "a" should currently hold the value "3" as indicated by the risk summary. Conversely, if the user input directed execution towards risk summary "D" 308, the variable "a" should hold the current value of 2. In the first instance, the processor 110 will only access the stored risk summary "C" 306 and will ignore risk summary "D" 308 because the selected execution path precludes the use of the execution path associated with risk summary "D" 308. If the processor compares the runtime value of "a" to the risk summary "C" 306 and determines that a=3, the execution session may continue uninterrupted. If "a" is not equal to 3 then the processor 110 may initiate an alert.

The execution path assessment may continue in this manner from risk assessments 310 through 318. The particular combination of path segments selected throughout the execution session may be the current execution path. Both the current path segment and the current execution path may be monitored by the processor 110 throughout the second analysis 222 to determine whether data leaks occur. In various implementations, when a new execution path is used, the processor 110 may generate a new risk summary 218 based on preexisting risk summaries 218. In the illustrated example, if the path segment associated risk summary "G" 314 was previously unexecuted, the generation of risk summary "G" by the processor 110 would include analysis of both the path "A-B-C-E" and "A-B-D-E" because both paths feed into the current path segment (i.e., the path segment associated with risk summary "G"). Both paths may be analyzed by the first analysis 214 at runtime, to determine what values of the variable "b" might result in data leaks during the path segment associated with risk summary "G" 314. In the illustrated example, the first analysis 214 may determine that the only acceptable value for "b" is 2. Thus, the risk summary "G" 314 having the expression b=2 may be generated by the processor 110 and stored in the memory 135 for use in future execution sessions.

Figure 4:
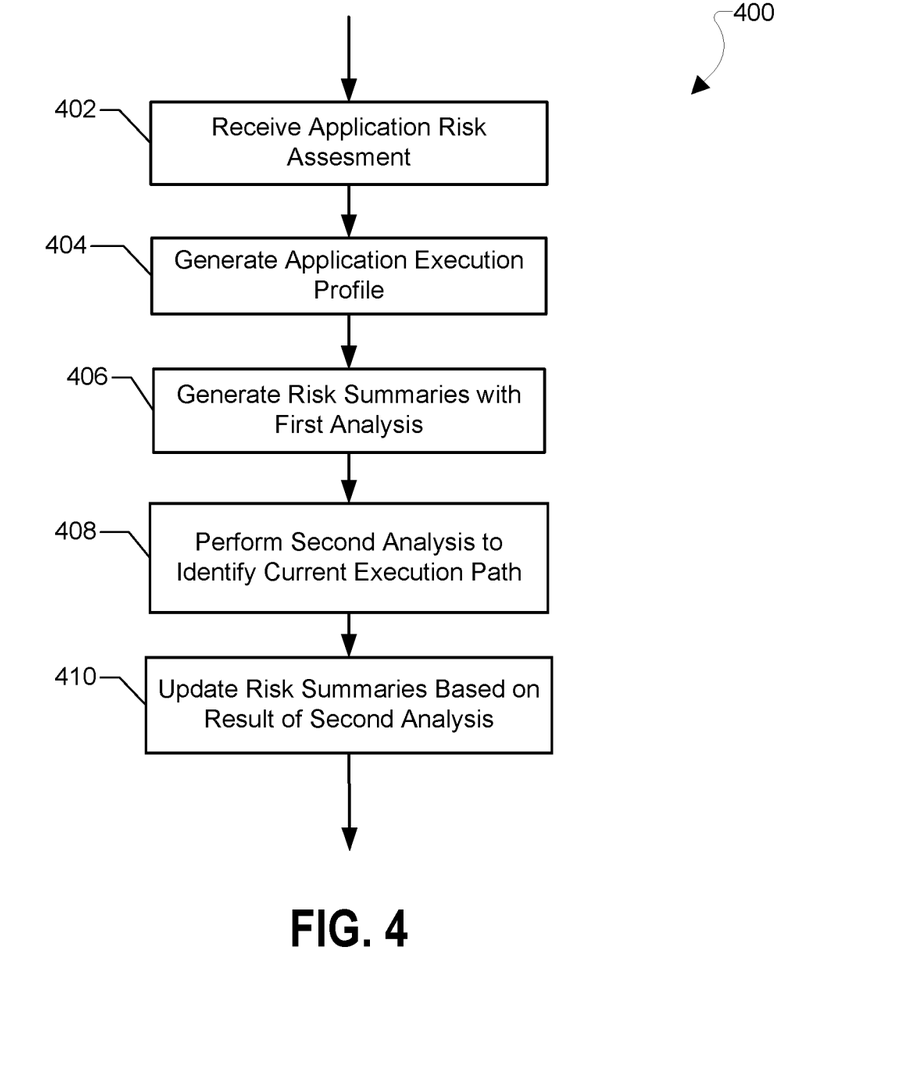
FIG. 4 is a process flow diagram illustrating an embodiment method of tracking information flow in an application executing on a computing device according to various embodiments.

FIG. 4 illustrates a process flow diagram of an embodiment method for information flow tracking in executing software applications in various embodiments. The embodiment method 400 may be implemented on a computing device 100 and carried out by a processor 110 in communication with the communications subsystem 130, and the memory 135. In block 402, the communications subsystem 130 of the computing device 100 may receive an application risk assessment 204. The application risk assessment 204 may be the result of a robust application code analysis by a remote computing device to identify portions of application code presenting potential for data leaks.

In block 404, the processor 110 of the computing device 100 may generate an application execution profile 216. As is described in greater detail with reference to FIG. 5, blocks 502-504, the application execution profile may be the result of one or more path analyses performed by the processor 110. The application execution profile may include execution paths and associated path segments (i.e., those path segments making up the execution path) that are most likely to be executed in a user-initiated application execution session.

In block 406, the processor 110 of the computing device 100 may generate one or more risk summaries 218. Risk summaries 218 may be generated as a result of a first analysis 214, which reviews each execution path, as identified by the application execution profile 216, for instances of the application code identified in the application risk assessment 204. The risk summaries 218 may include an expression to be evaluated at a particular path segment to enable the processor 110 to detect an emergent data leak during a runtime analysis. In various implementations, the first analysis may be a static analysis that is not modified based on usage patterns.

In block 408, the processor 110 of the computing device 100, during execution of an application, may perform a second analysis on the executing software application 202. The second analysis may identify and track the current path of execution (e.g., the sum of all path segments executed thus far), and may further track the current path segment being executed. As will be described in greater detail with reference to FIG. 6, the second analysis may also determine whether the current execution path is a new execution path.

In block 410, the processor 110 of the computing device 100 may update risk summaries based on results of the second analysis of the current execution path. More specifically, the risk summaries 218 may be updated or modified based on whether the current execution path is a new path 225*a* or an existing path 225*b*. Risk summaries 218 may be combined, broken apart, or otherwise modified as new execution paths are executed or as existing execution paths become inactive.

Figure 5:
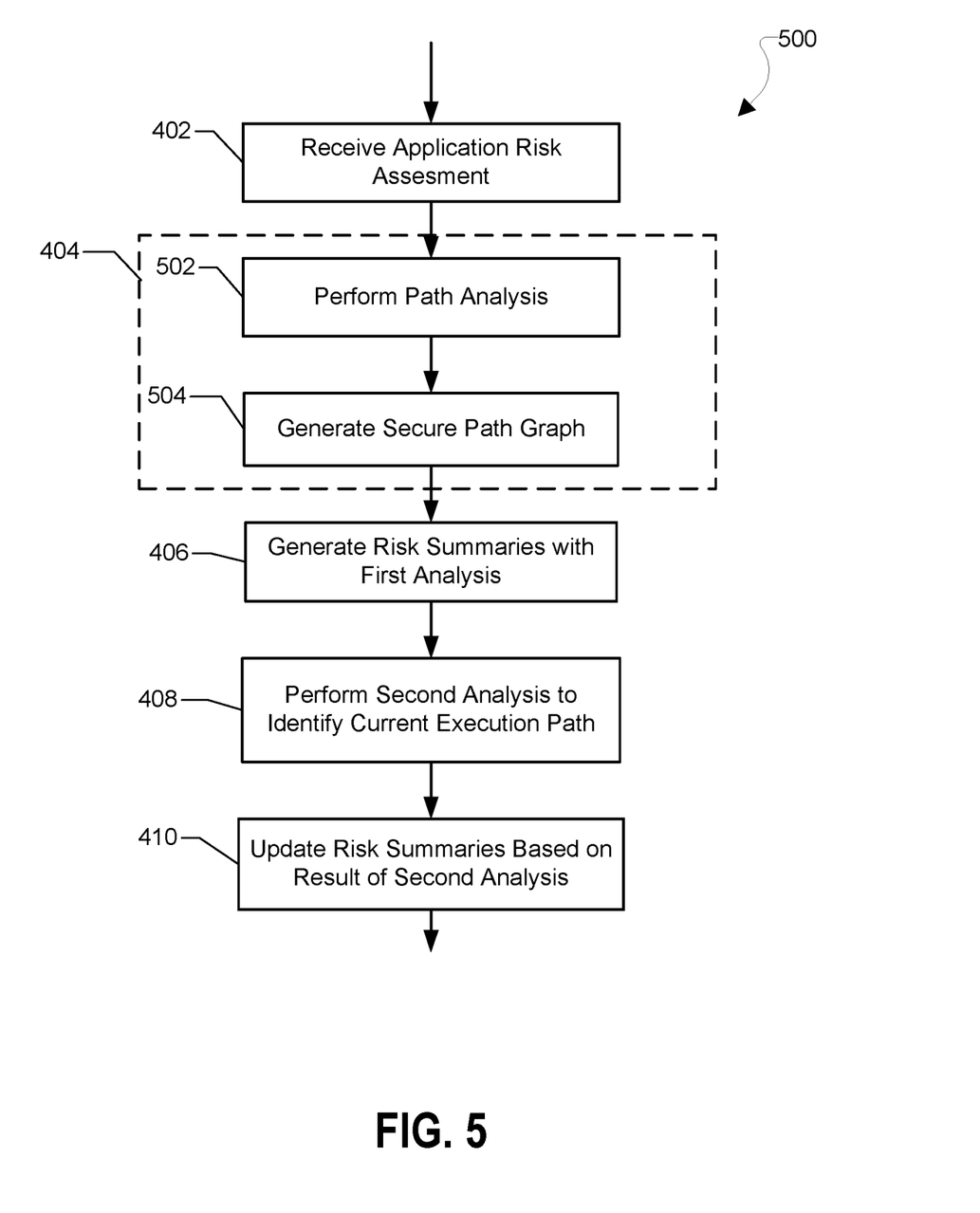
FIG. 5 is a process flow diagram illustrating an embodiment method of tracking information flow in an application executing on a computing device according to various embodiments.

FIG. 5 illustrates a process flow diagram of an embodiment method for information flow tracking in executing software applications in various embodiments. The embodiment method 500 may be implemented on a computing device 100 and carried out by a processor 110 in communication with the communications subsystem 130, and the memory 135. Method 500 may be substantially similar to method 400 as described with reference to FIG. 4, with the exception that the operations in block 404 are replaced with the operations in blocks 502-504.

In block 502, the processor 110 of the computing device 100, may perform a path analysis on the application code of the software application 202. Using the path analysis, the processor 110 may identify subcomponents of execution paths. These path segments may be useful in generating precise risk summaries, which the processor may use at runtime to quickly identify data leaks within execution paths. The path segments may be presented in a graph, chart, listing, or any other logical representation.

In block 504, the processor 110 of the computing device 100, may generate a secure path graph. The result of the secure path graph algorithm may be the application execution profile 216 (i.e., secure path graph). In the various embodiments, the application execution profile 216 may include execution paths identified as likely to be used during a user-initiated execution session. In other words, the application execution profile 216 may identify commonly used execution paths and their associated path segments.

Figure 6:
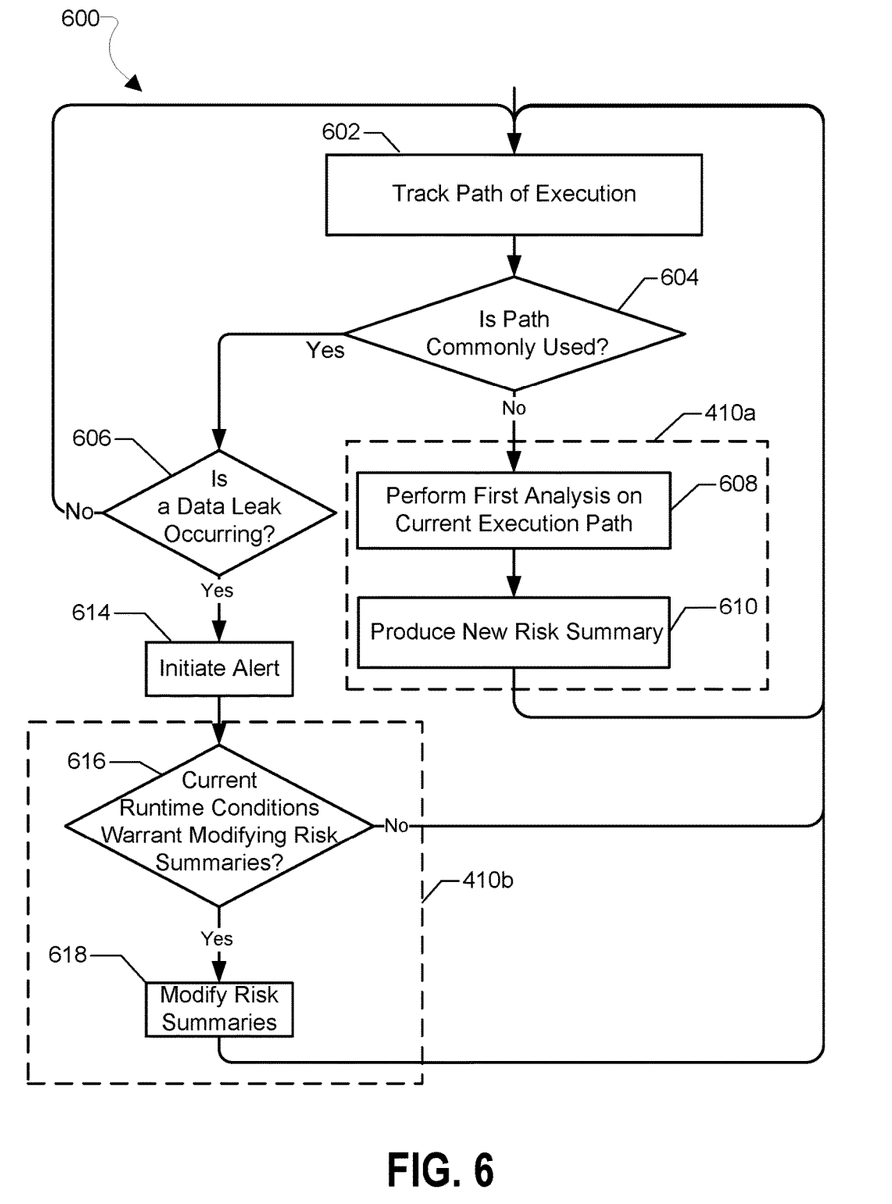
FIG. 6 is a process flow diagram illustrating an embodiment method of implementing a dynamic software application analysis according to various embodiments.

FIG. 6 illustrates a process flow diagram of an embodiment method for performing a second analysis during an execution session of an application as in various embodiments. The embodiment method 600 may be implemented on a computing device 100 and carried out by a processor 110 in communication with the communications subsystem 130, and the memory 135.

In block 602, the processor 110 of the computing device 100, as part of a second analysis (i.e., block 408 in FIGS. 4 and 5) may track the path of execution during a software application execution session. The processor 110 may monitor the execution path as it incrementally advances through different path segments that were previously identified during generation of the application execution profile 216 by the processor 110. While tracking the execution path, the processor 110 may maintain a temporary record of the current execution path (i.e., the total path executed thus far), and a temporary identifier (e.g., a pointer or variable) of the current path segment.

In determination block 604, the processor 110 of the computing device 100, may determine whether the current execution path is a commonly used path. Commonly used paths are those execution paths associated with pre-existing risk summaries, and are not marked with an inactive status. For example, the processor 110 may reference a directory or other data structure, or the stored risk summaries 218 to determine whether the current execution path is an existing path 225b or a new path 225a. New paths are paths that may not have risk summaries 218 corresponding to all path segments of the execution path.

In response to determining that the current execution path is not a commonly used path (i.e., determination block 604="No"), the processor 110 may update the risk summaries 218 in block 410a by performing operations of blocks 608-610.

In block 608, the processor 110 of the computing device 100 may perform the first analysis 214 on the current execution path. Performing the first analysis 214 may include analyzing all possible execution path permutations that lead to the current path segment. The processor 110 may thus determine the combinations of runtime conditions that will or could result in data leaks.

In block 610, the processor 110 may generate a new risk summary 218 based on the result of the first analysis 214. In various implementations, existing risk summaries 218 may be combined or split in order to gain information about the runtime conditions that could result in data leaks during execution of the current path segment. After generating and storing the new risk summary 218 in memory 135 in block 610, the processor 110 may continue performing the second analysis by resuming tracking of the execution path in block 602.

In response to determining that the current execution path is a commonly used path (i.e., determination block 604="Yes'), the processor 110 of the computing device 100 may determine whether a data leak is occurring in determination block 606. The processor 110 may access a stored risk summary 218 associated with the current path segment and evaluate the risk summary expression to determine whether a data leak is occurring. In response to determining that no data leak is detected (i.e., block 606="No"), the processor 110 may continue tracking the execution path during the execution session in block 602.

In response to determining that a data leak is occurring (i.e., determination block 606="Yes"), the processor 110 may initiate an alerts such as a message displayed on the screen, an audible noise played over speakers, or a tactile feedback vibration in block 614, and potentially modify risk summaries 218 in block 410b by performing operations of blocks 616-618.

In determination block 616, the processor 110 of the computing device 100 may determine whether current runtime conditions warrant modifying respective risk summaries 218. For example, the processor 110 may determine that a path segment is rarely used or that data leaks never occur within the path segment and therefore the associated risk summary may be moved to an inactive status. Conversely, the processor 110 may determine that the current path segment is a highly active path segment and therefore dividing the risk summary of the current path segment into two risk summaries may be beneficial to reduce the size of application code associated with respective risk summaries 218.

In response to determining that current runtime conditions warrant modifying the risk summaries, (i.e., block 616="Yes), the processor 110 may modify the risk summaries 218 in block 618, and return to tracking the execution path in block 602.

In response to determining that current runtime conditions do not warrant modifying the risk summaries, (i.e., determination block 616="No"), the processor 110 may continue tracking the execution path in block 602. In the various embodiments, the operations in blocks 616-618 may replace the operations in block 410 of the method 400 when the current execution path is a commonly used path.

To restate, the various embodiments may include a method of tracking information flow in an application executing on a computing device such as a laptop, a smartphone, a wearable computing device, etc. The method may comprise receiving an application risk assessment, such as a risk assessment file, including sections of application code that may cause data leaks when executed. Further, the method may include generating an application execution profile including commonly used execution paths for the application. The application execution profile may contain information on execution paths and path segments that are likely to be executed during a user-initiated application execution session. Predetermining the execution paths most likely to be used (i.e., commonly used), reduces the number of risk summaries that must be generated and reviewed to only those likely to be relevant to execution. The method may include generating risk summaries based on performing a first analysis on the application execution profile and the application risk assessment. The risk summaries may provide information about specific conditions under which data leaks may occur within each path segment of an execution path. The method may also include performing a second analysis on the application code during execution of the application to identify a current execution path and current path segment. Based on a result of the second analysis, the computing device may update the risk summaries.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a subscription and data receiving associated with a different subscription, such identifiers are merely for convenience and are not meant to limit various embodiments to a particular order, sequence, type of network or carrier.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, (e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RANI, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of tracking information flow in an application executing on a computing device, comprising:
   receiving, via a processor in the computing device, an application risk assessment of the application including sections of application code that may cause data leaks when executed;
   generating, via the processor, an application execution profile including commonly used execution paths for the application;
   generating, via the processor, one or more risk summaries based on performing a first analysis on the application execution profile and the application risk assessment;
   performing, via the processor, a second analysis on the application code during execution of the application to identify a current execution path and current path segment;
   determining, via the processor, whether the current execution path is a commonly used execution path;
   determining, via the processor and in response to determining that the current execution path is the commonly used execution path, whether a data leak is occurring by comparing the one or more risk summaries to the current path segment; and
   updating, via the processor and in response to determining that the current execution path is not the commonly used execution path, the one or more risk summaries.

2. The method of claim 1, wherein the application risk assessment is generated by a separate device performing a robust analysis of the application to identify code segments presenting potential data leaks.

3. The method of claim 1, wherein generating the one or more risk summaries based on performing the first analysis on the application execution profile and the application risk assessment comprises generating the one or more risk summaries based on performing a static analysis performed prior to the execution of the application.

4. The method of claim 1, wherein performing the second analysis on the application code during the execution of the application to identify the current execution path and the current path segment comprises tracking the current execution path during the execution of the application.

5. The method of claim 1, wherein updating, via the processor and in response to determining that the current execution path is not the commonly used execution path, the one or more risk summaries comprises updating the one or more risk summaries based on a result of performing the second analysis on the application code during the execution of the application.

6. The method of claim 5, wherein updating the one or more risk summaries based on the result of performing the second analysis on the application code during the execution of the application comprises:
   determining whether current runtime conditions warrant modifying an existing risk summary; and
   modifying the existing risk summary in response to determining that current runtime conditions warrant modifying the existing risk summary.

7. The method of claim 5, further comprising:
   performing the first analysis on the current execution path; and
   generating a second risk summary based on existing risk summaries that have path segments in common with the current execution path.

8. The method of claim 7, wherein generating the second risk summary based on the existing risk summaries that have path segments in common with the current execution path comprises combining portions of the existing risk summaries to generate the second risk summary.

9. The method of claim 7, wherein generating the second risk summary based on the existing risk summaries that have path segments in common with the current execution path comprises selecting portions of the existing risk summaries to generate the second risk summary.

10. The method of claim 1, wherein generating the application execution profile further comprises:

performing a path analysis on the application code of the application to identify execution paths and associated path segments; and generating a secure path graph based on identified execution paths and path segments.

11. The method of claim 10, wherein performing the path analysis on the application code of the application to identify the execution paths and the associated path segments comprises performing a Ball-Larus path analysis on the application code of the application to identify the execution paths and the associated path segments.

12. A computing device, comprising:
a non-transitory memory; and
a processor coupled to the non-transitory memory, wherein the processor is configured with processor-executable instructions to perform operations comprising:
receiving an application risk assessment of an application including sections of application code that may cause data leaks when executed;
generating an application execution profile including commonly used execution paths for the application;
generating one or more risk summaries based on performing a first analysis on the application execution profile and the application risk assessment;
performing a second analysis on the application code during execution of the application to identify a current execution path and current path segment; and
determining whether the current execution path is a commonly used execution path;
determining, in response to determining that the current execution path is the commonly used execution path, whether a data leak is occurring by comparing the one or more risk summaries to the current path segment; and
updating, in response to determining that the current execution path is not the commonly used execution path, the one or more risk summaries.

13. The computing device of claim 12, wherein the processor configured with processor-executable instructions to perform operations such that receiving the application risk assessment comprises receiving the application risk assessment from a remote device performing a robust analysis of the application to identify code segments presenting potential data leaks.

14. The computing device of claim 12, wherein the processor configured with processor-executable instructions to perform operations such that generating the one or more risk summaries based on performing the first analysis on the application execution profile and the application risk assessment comprises generating the one or more risk summaries based on performing a static analysis prior to the execution of the application.

15. The computing device of claim 12, wherein the processor is further configured with processor-executable instructions to perform operations such that performing the second analysis on the application code during the execution of the application to identify the current execution path and the current path segment comprises tracking the current execution path during the execution of the application.

16. The computing device of claim 12, wherein the processor is further configured with processor-executable instructions to perform operations further comprising updating, in response to determining that the current execution path is not the commonly used execution path, the one or more risk summaries comprises updating the one or more risk summaries based on a result of performing the second analysis on the application code during the execution of the application.

17. The computing device of claim 16, wherein the processor is further configured with processor-executable instructions to perform operations such that updating the one or more risk summaries based on the result of performing the second analysis on the application code during the execution of the application comprises:
determining whether current runtime conditions warrant modifying an existing risk summary; and
modifying the existing risk summary in response to determining that current runtime conditions warrant modifying the existing risk summary.

18. The computing device of claim 16, wherein:
the processor is configured with processor-executable instructions to perform operations further comprising:
performing the first analysis on the current execution path; and
generating a second risk summary based on existing risk summaries that have path segments in common with the current execution path.

19. The computing device of claim 18, wherein the processor is further configured with processor-executable instructions to perform operations such that generating the second risk summary based on the existing risk summaries that have path segments in common with the current execution path comprises combining portions of the existing risk summaries to generate the second risk summary.

20. The computing device of claim 18, wherein the processor is further configured with processor-executable instructions to perform operations such that generating the second risk summary based on the existing risk summaries that have path segments in common with the current execution path comprises selecting portions of the existing risk summaries to generate the second risk summary.

21. The computing device of claim 12, wherein the processor is further configured with processor-executable instructions to perform operations such that generating the application execution profile comprises:
performing a path analysis on the application code of the application to identify execution paths and associated path segments; and
generating a secure path graph based on identified execution paths and path segments.

22. The computing device of claim 21, wherein the processor is further configured with processor-executable instructions to perform operations such that performing the path analysis on the application code of the application to identify the execution paths and the associated path segments comprises performing a Ball-Larus path analysis on the application code of the application to identify the execution paths and the associated path segments.

23. A computing device, comprising:
means for receiving an application risk assessment of an application including sections of application code that may cause data leaks when executed;
means for generating an application execution profile including commonly used execution paths for the application;
means for generating one or more risk summaries based on performing a first analysis on the application execution profile and the application risk assessment;
means for performing a second analysis on the application code during execution of the application to identify a current execution path and current path segment;

means for determining whether the current execution path is a commonly used execution path;

means for determining, in response to determining that the current execution path is the commonly used execution path, whether a data leak is occurring by comparing the one or more risk summaries to the current path segment; and means for updating, in response to determining that the current execution path is not the commonly used execution path, the one or more risk summaries.

24. A non-transitory processor readable storage medium having stored thereon processor-executable instructions configured to cause a processor to perform operations comprising:

receiving an application risk assessment of an application including sections of application code that may cause data leaks when executed;

generating an application execution profile including commonly used execution paths for the application;

generating one or more risk summaries based on performing a first analysis on the application execution profile and the application risk assessment;

performing a second analysis on the application code during execution of the application to identify a current execution path and current path segment;

determining whether the current execution path is a commonly used execution path;

determining, in response to determining that the current execution path is the commonly used execution path, whether a data leak is occurring by comparing the one or more risk summaries to the current path segment; and updating, in response to determining that the current execution path is not the commonly used execution path, the one or more risk summaries.

25. The non-transitory processor readable storage medium of claim 24, wherein the stored processor-executable instructions are configured to cause the processor to perform operations such that generating the one or more risk summaries based on performing the first analysis on the application execution profile and the application risk assessment comprises generating the one or more risk summaries based on performing a static analysis prior to the execution of the application.

26. The non-transitory processor readable storage medium of claim 24, wherein the stored processor-executable instructions are configured to cause the processor to perform operations such that performing the second analysis on the application code during the execution of the application to identify the current execution path and the current path segment comprises tracking the current execution path during the execution of the application.

27. The non-transitory processor readable storage medium of claim 24, wherein the stored processor-executable instructions are configured to cause the processor to perform operations such that updating, in response to determining that the current execution path is not the commonly used execution path, the one or more risk summaries comprises updating the one or more risk summaries based on a result of performing the second analysis on the application code during the execution of the application.

28. The non-transitory processor readable storage medium of claim 27, wherein the stored processor-executable instructions are configured to cause a processor to perform operations such that updating the one or more risk summaries based on the result of performing the second analysis on the application code during the execution of the application comprises:

determining whether current runtime conditions warrant modifying an existing risk summary; and modifying the existing risk summary in response to determining that current runtime conditions warrant modifying the existing risk summary.

29. The non-transitory processor readable storage medium of claim 27, wherein the stored processor-executable instructions are configured to cause a processor to perform operations further comprising:

performing the first analysis on the current execution path; and generating a second risk summary based on existing risk summaries that have path segments in common with the current execution path.

30. The non-transitory processor readable storage medium of claim 24, wherein the stored processor-executable instructions are configured to cause a processor to perform operations such that generating the application execution profile comprises:

performing a path analysis on the application code of the application to identify execution paths and associated path segments; and generating a secure path graph based on identified execution paths and path segments.

* * * * *